United States Patent [19]

Sonberg et al.

[11] Patent Number: 5,440,614
[45] Date of Patent: Aug. 8, 1995

[54] SYSTEM AND METHOD FOR DYNAMICALLY SPECIFYING THE MANNER IN WHICH CALLS TO A ROAMING CELLULAR TELEPHONE SUBSCRIBER ARE TO BE HANDLED

[75] Inventors: Kenneth W. Sonberg, Medford; Timothy A. Bein, Millbury, both of Mass.

[73] Assignee: Electronic Data Systems Corporation, Plano, Tex.

[21] Appl. No.: 295,971

[22] Filed: Aug. 25, 1994

Related U.S. Application Data

[60] Continuation of Ser. No. 935,054, Aug. 24, 1992, abandoned, which is a division of Ser. No. 565,016, Aug. 9, 1990, Pat. No. 5,142,654.

[51] Int. Cl.⁶ .............................................. H04Q 7/38
[52] U.S. Cl. ........................................ 379/60; 379/59; 455/33.2
[58] Field of Search ................... 379/59, 60, 201, 207, 379/211; 455/33.1, 33.2

[56] References Cited

U.S. PATENT DOCUMENTS 4,112,257  9/1978  Frost ..................................... 379/60
4,901,340  2/1990  Parker et al. ......................... 379/60

OTHER PUBLICATIONS

E.I.A. Proposal "Straw Man For Automatic Roaming", Jun. 1985, pp. 1–24.

Primary Examiner—Dwayne D. Bost
Attorney, Agent, or Firm—L. Joy Griebenow

[57] ABSTRACT

Disclosed is a system and method for enabling a cellular telephone subscriber located in a foreign service area to designate how calls placed to the subscriber should be handled by entering selections (such as call forwarding, caller notification) from the keyboard of his mobile telephone set. When these selections are received by a foreign service MTSO, the foreign service MTSO validates the roaming subscriber and the services that are available to the subscriber and then notifies the home MTSO how calls received at the home site should be handled. If the caller is to receive calls in the foreign service area (either forwarded calls or direct calls to the foreign service area), the foreign MTSO assigns a temporary roaming number to the subscriber for use in the foreign service area after the subscriber has been validated.

34 Claims, 7 Drawing Sheets

SYSTEM AND METHOD FOR DYNAMICALLY SPECIFYING THE MANNER IN WHICH CALLS TO A ROAMING CELLULAR TELEPHONE SUBSCRIBER ARE TO BE HANDLED

This application is a continuation-in-part, division of application Ser. No. 07/935.054, filed Aug. 24, 1992, now abandoned, which is a division of 07/565,016 filed Aug. 9, 1990, now U.S. Pat. No. 5,142,654.

BACKGROUND OF THE INVENTION

The present invention relates to cellular telephone communication systems, and more particularly to a system and method that provides for dynamic switching between call handling options such as caller notification and forwarding.

A conventional cellular system consists of a Mobile Telephone Switching Office (MTSO) which is surrounded by a set of cell sites. A mobile subscriber establishes a radio frequency (RF) communications link with a cell site by initiating a call. Each of the cell sites is coupled to the MTSO. The MTSO is also coupled to the Public Switched Telephone Network (PSTN), by dedicated lines. The range of a particular cellular service is determined by the geographic location of cell sites. When a subscriber to a cellular mobile telephone service leaves the range that is covered by his home service area and enters a foreign service area, calls that are received need to be handled in an appropriate manner. For example, the caller could be informed of the location of the subscriber; the calls could be forwarded directly to the subscriber; or the calls could be routed through the subscriber's voice mail service.

The forwarding of calls directly to the subscriber is not always appropriate, because in the present cellular telephone environment, the subscriber pays for the cost of the call. This means that a subscriber may be receiving calls that he does not want to receive and that he has to pay for. For this reason, subscribers frequently have calls sent to a voice mailbox or have the caller place the call directly to a foreign service area, in which case the caller would pay the long distance telephone charges. A subscriber using a cellular telephone in a foreign service area is generally referred to as a "roamer".

In order for a subscriber to instruct a caller to call a roaming subscriber, the subscriber would have to manually inform each potential caller of the roamer access number of the cellular telephone system that the roamer is using. Since the roamer could be moving from one roamer site to another, this is not always practical. Call delivery systems provided by some switch manufacturers (such as Motorola, AT & T and Ericsson) as well as the Follow Me Roaming product offered by GTE reduce this inconvenience to some extent but do not provide options of the present invention.

It is therefore a principal object of the present invention to provide a cellular telephone system and method that dynamically switches between call handling options.

Another object of the present invention is to provide a cellular telephone system and method that automatically initiates call forwarding to a foreign service area after a subscriber places a first call in the foreign service area or enters a foreign service area with the cellular phone switched on.

SUMMARY OF THE INVENTION

Accordingly, in the present invention, a subscriber in a foreign service area site is able to designate how his call should be handled by entering selections (such as call forwarding, caller notification) from the keyboard of his mobile telephone set. When these selections are received by a foreign service MTSO, the foreign service MTSO sends a request to the central host computer which validates the roaming subscriber and the services that are available to the subscriber and then notifies the home MTSO how calls received at the home site should be handled. If the caller is to receive calls in the foreign service area (either forwarded calls or direct calls to the foreign service area), the foreign MTSO assigns a temporary roaming number to the subscriber for use in the foreign service area after the subscriber has been validated.

These and other features and objects of the present invention will be more fully understood from the following detailed description which should be read in connection with several drawings in which corresponding reference numerals refer to corresponding parts throughout the several views.

DETAILED DESCRIPTION OF PREFERRED EMBODIMENTS

Figure 1:
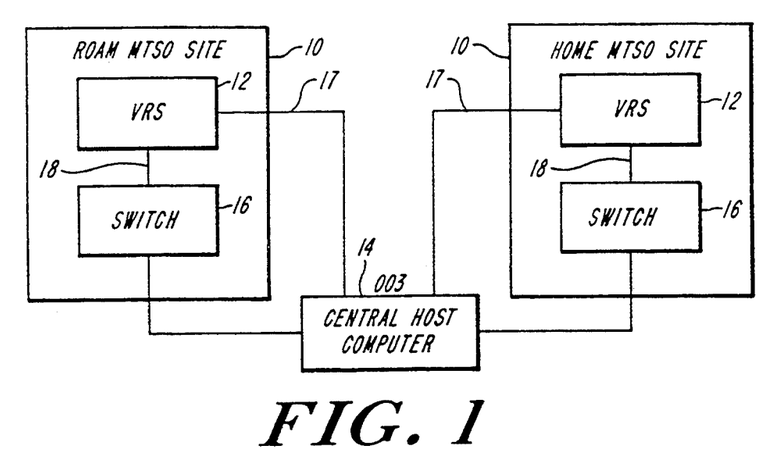
FIG. 1 is a schematic diagram of the cellular telephone system of the present invention which provides for dynamic switching between call routing options.

Referring to FIG. 1, each MTSO has a voice response system (VRS) 12 and an interface that connects to a central host computer 14. In order to simplify the following discussion, only two MTSO sites are shown, but an actual implementation would have multiple MTSO sites, similarly configured, and connected to a central host computer. In addition, while one of the MTSO sites is designated as a home site, and the other is designated as a roam site, either site will function as either a home or a roam site.

The VRS 12 is connected to the MTSO switch 16 via a digital telephone interface 18. The home MTSO switch 16 is programmed to route all calls for a roamer that has selected a call routing option. In a preferred embodiment a roamer selects a call routing option by entering specific codes in his handset, either while in his home service area or a foreign service area. The following code sequences are one set that may be used to select a variety of functions:

| Code | Call Routing Function Being Requested Under Dialed Code |
|---|---|
| *31 | Activates transparent call forwarding |
| *32 | Activates caller notification |
| *30 | Deactivates roaming service |
| *310 | Deactivates transparent call forwarding/(route to voice mail) |
| *320 | Deactivates caller notification/(route to voice mail) |

Figure 2:
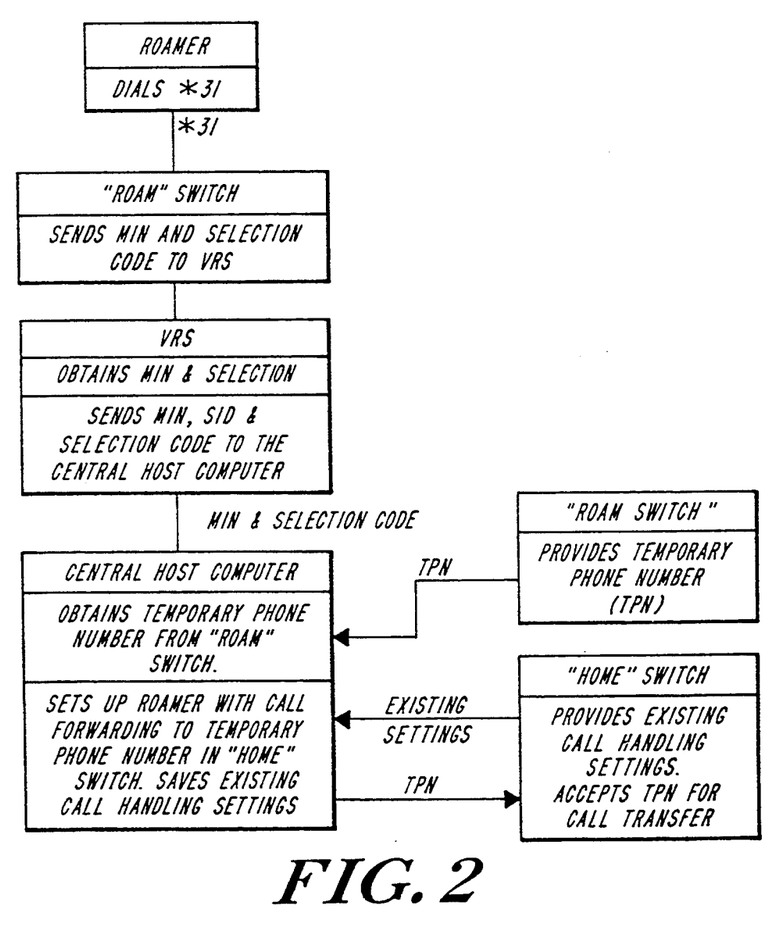
FIG. 2 is a diagram of the functions performed by the elements of the cellular telephone system shown in FIG. 1 when the subscriber selects the call forwarding option.

Referring now to FIG. 2, the activating of transparent call forwarding will now be described. When a roamer dials *31, the foreign MTSO switch 16 sends the mobile identification number (MIN) and the code for the selected call routing option to the VRS 12. In a preferred embodiment the physical interface is a T-1 (DS1 span), and multi-frequency (MF) signalling is utilized to pass the information from the switch 16 to the VRS 12. The VRS 12 accepts the information and communicates it to the central host computer 14 via a data communications link 17.

A central host computer 14 after receiving the mobile identification number and selection code for the call routing option validates the subscriber to assure, among other things, that the subscriber's carrier in his home service area is part of the network companies supporting call forwarding. The appropriate commands are then sent by the central host computer 14 to the home MTSO to set up the call routing option that has been specified by the roamer. If the call routing option that was selected by the roamer is transparent call forwarding, the central host computer 14 obtains a temporary telephone number from the roam MTSO that would be associated with the MIN of the roamer. This temporary telephone number must be assessable via the PSTN because it is the phone number to which the caller will be transferred. After the temporary telephone number is obtained from the roam MTSO, the central host computer 14 signals the home MTSO to complete activation. The central host computer 14 first determines that the roamer is currently call forwarded or no-answer transferred to other numbers, and if so, these numbers are saved and the existing feature is deactivated so that calls will no longer be directed to the numbers where they were previously directed. If the roamer does not have the no-answer feature, the feature is temporarily provided. The no-answer transfer telephone number that is entered is the temporary number that was obtained previously from the roam MTSO.

Figure 3:
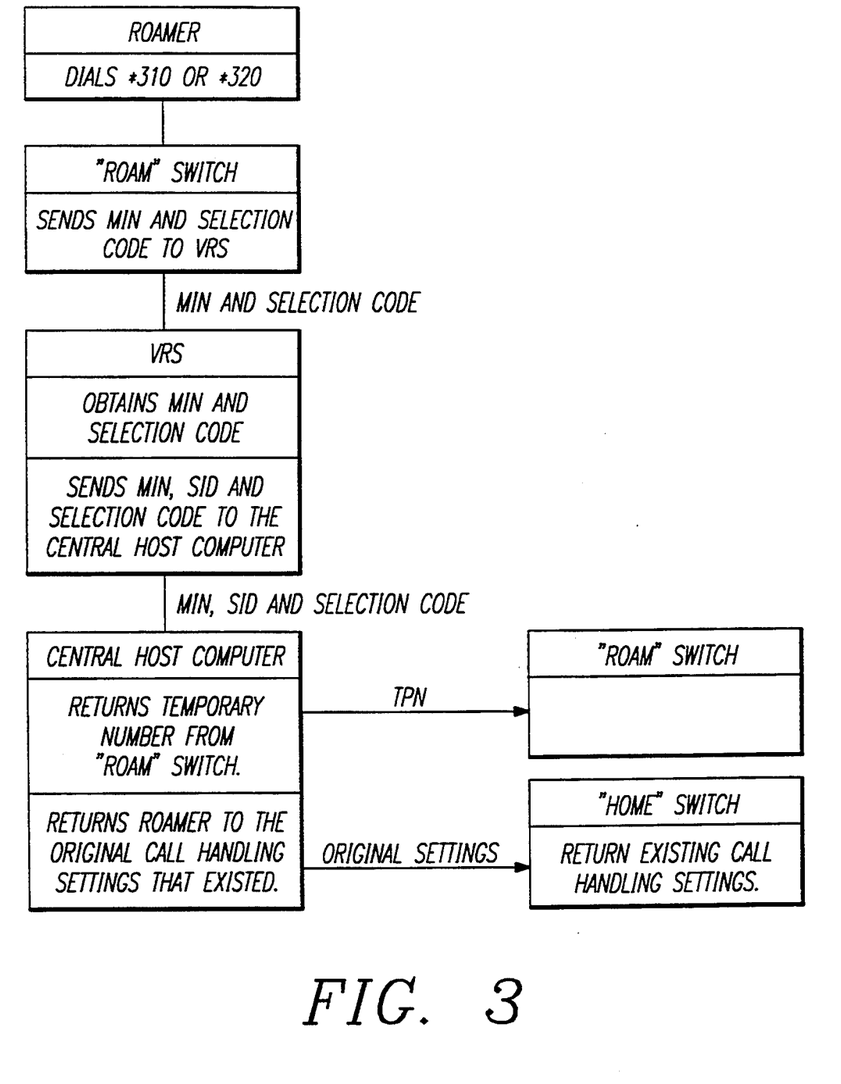
FIG. 3 is a diagram of the functions performed by the elements of the cellular telephone system shown in FIG. 1 when the subscriber deactivates the selected call routing option.

Referring now to FIG. 3, when the central host computer 14 determines that it is time to deactivate a call routing of a roamer, it sends commands simultaneously to a home MTSO and the roam MTSO. At the home MTSO the roamer is restored to his original call routing status with the former call forwarding and no-answer transfer numbers restored. At the roam MTSO, the temporary phone number that has been obtained is freed so that it can be used for other roamers. Deactivation is initiated by either the roamer selecting a deactivation of the call forwarding from the mobile telephone by dialing *310, or automatically after x number of hours (where x can be set dynamically by the carrier).

Figure 4:
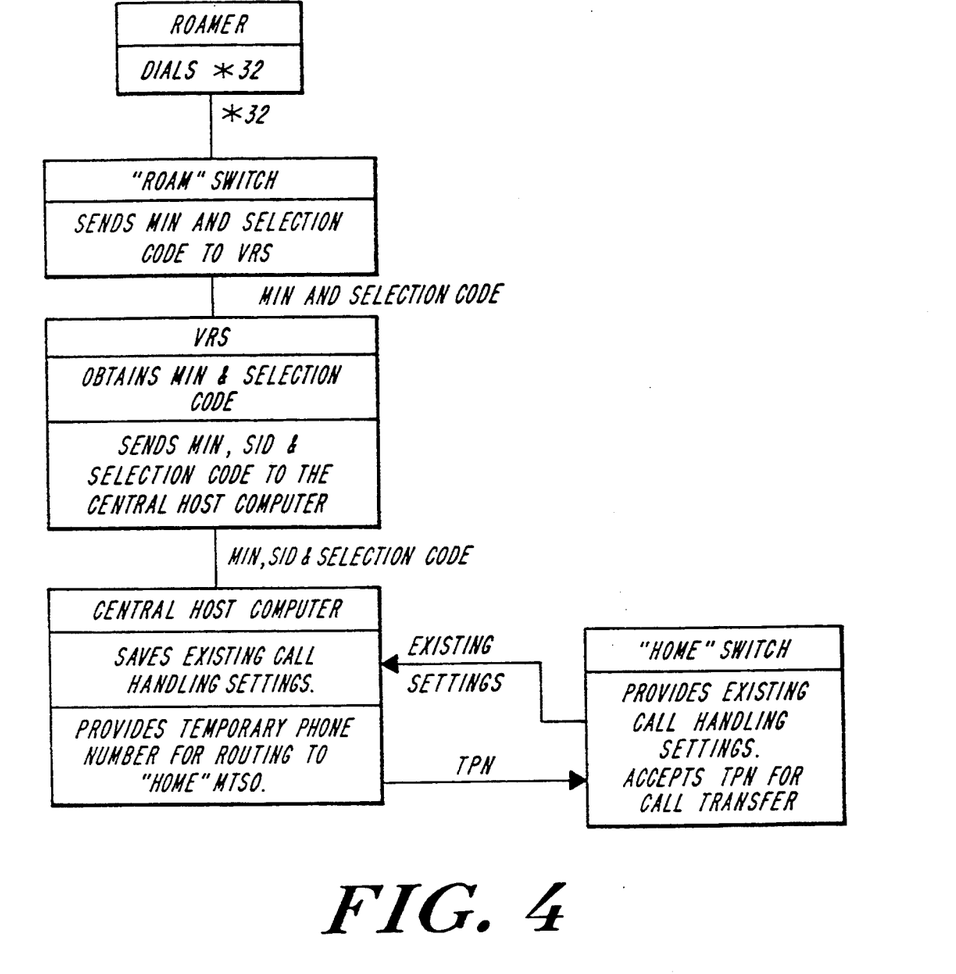
FIG. 4 is a diagram of the functions performed by the elements of the cellular telephone system shown in FIG. 1 when the subscriber selects the caller notification option.

Referring now to FIG. 4, if the roamer selects the call routing option of caller notification by dialing *32, all calls to the roamer will be routed to the VRS 12 located at the home site. The central host computer 14 will check with the home MTSO to determine if the roamer is currently call-forwarded or no-answer transferred to other numbers, and if so, these numbers are saved and the existing feature is deactivated. If the roamer does not have the no-answer feature, the feature is temporarily provided by providing a no-answer telephone number to the home switch. The no-answer transfer telephone number that is entered is the number that connects to the VRS 12 at the home MTSO site. The central host computer 14 also provides to the home switch a switch code of the roam site where the roamer is located. The home switch is programmed to out pulse this switch code as an MF digit spill at the start of the call to the VRS. The VRS is programmed to analyze this digit spill and play a message to the caller which indicates where the roamer is located, and the roamer port access number that should be used to call the roamer. An example of a message that would be played is: "The person that you have called is out of the local area. If you wish to reach this person, please call 609-226-7626 in Atlantic City, N.J."

A different message for each possible roam site is required. The VRS 12 maintains a table of switch codes and roam site messages. Preferably, each roam site message includes a roamer port access number and the name of the city where the roam MTSO is located.

Figure 5:
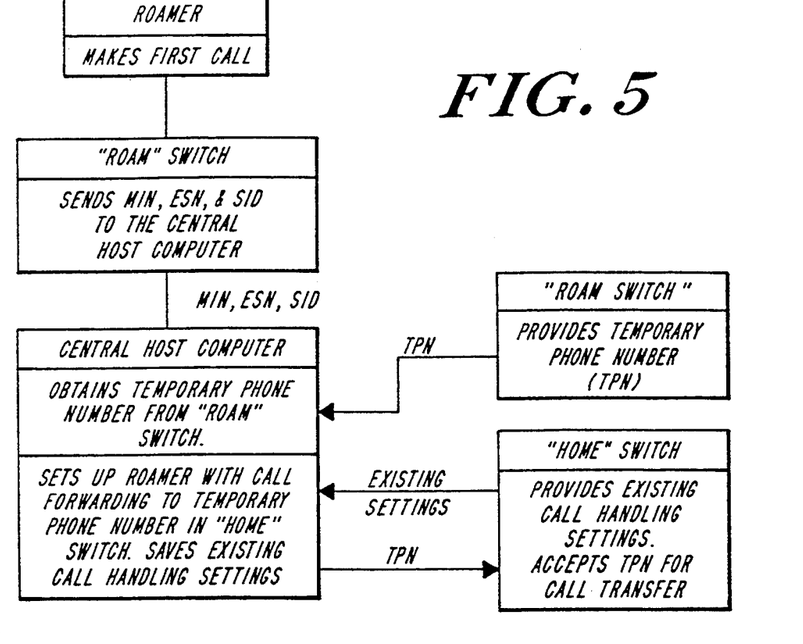
FIG. 5 is a diagram of the functions performed by the elements of the cellular telephone system shown in FIG. 1 when automatic call forwarding is put in effect.

If a roaming subscriber does not select a specific option when he is roaming, the system of the present invention will automatically activate a subscriber for automatic call forwarding when the roamer makes his first call in the roam site. In FIG. 5, the information flow for this activation of automatic call forwarding is shown. When the roamer makes his first call, the roam switch sends the MIN, roamer's electronic serial number (ESN) and the system ID (SID) of the roam switch to the central host computer 14. The central host computer 14 obtains the temporary phone number from the roam switch and sets up the roamer with call forwarding the temporary phone number to the home switch. The central host computer saves existing call handling settings.

Figure 6:
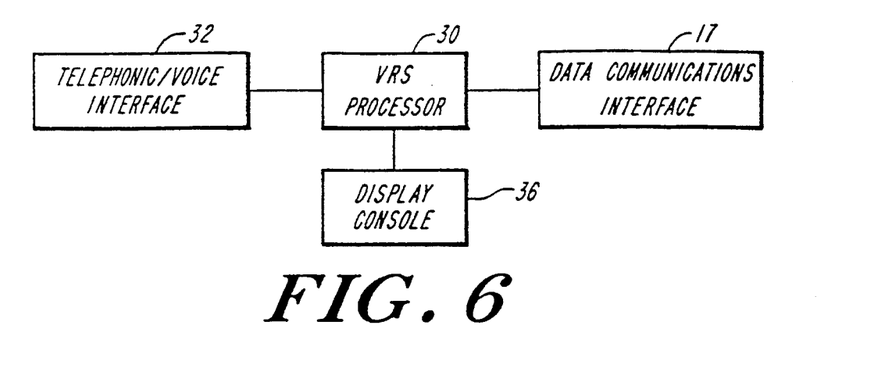
FIG. 6 is a schematic diagram of the elements of the voice response system of the cellular telephone system shown in FIG. 1.

A preferred embodiment of the elements of the VRS 12 are shown in FIG. 6. The VRS processor 30 in a preferred embodiment is implemented with a Hewlett-Packard Vectra ES/12 personal computer, available from Hewlett-Packard Corporation. The VRS processor 30 is equipped with 2Mbytes of Random Access Memory (RAM), a 40 Mbyte hard disk drive, and a data communications port. The telephonic/voice interface 32 includes boards from Dialogic Corporation, such as a DTI124T-1 Interface board, 4 port MF/40 boards and 4 port D40/B Voice Communications boards. A single VRS can be expanded to handle 24 simultaneous telephone calls by adding in the appropriate quantity of MF/40 and D40/B boards. The data communications interface,is an asynchronous, 1200 baud link, utilizing XON/XOFF protocol. The processor is coupled to the MTSO via the Telephonics/Voice interface 32. The physical interface is a T-1 interface and Multi-Frequency (MF) is utilized for signalling. The choice of T-1 and MF was based primarily on the interfaces that are most readily and economically available at the MTSO. Other schemes, such as analog transmission and DTMF signalling could just as readily have been utilized. A data communications interface 17 couples the VRS processor 30 to the central host computer, and a display console is provided for operator use.

Figure 7:
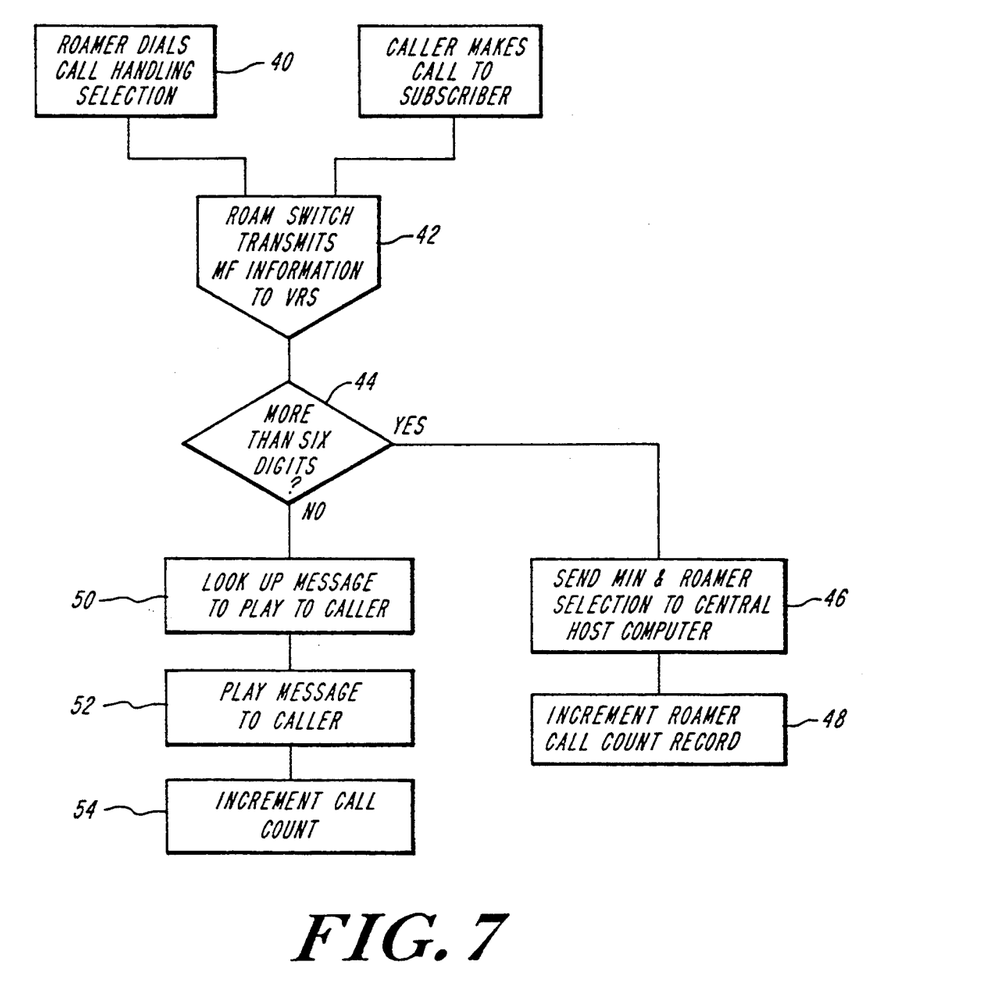
FIG. 7 is a flow chart of the operation of the cellular telephone system shown in FIG. 1.

FIG. 7 shows the steps that occur when the VRS establishes the call handling setup and processes calls to the roamer. For the roamer to establish the desired call routing option desired, the roamer dials the selection from the pushbutton keypad of his mobile telephone handset in step 40. In step 42, the MTSO, in turn, routes the selection that the roamer made and the MIN of the roamer to the VRS 12. The VRS determines whether the call is from a roamer setting up his call handling or a call to a roamer, by counting in step 44 the number of digits that were sent. The roam switch ID code is six digits. The selection code plus the MIN of the roamer is always in excess of six digits. In step 44, the VRS 12 determines if the number of digits is greater than six, and if it is, in step 46 the roamer selection, MIN of the roamer and the roam switch ID code are sent to the central host computer 14. The VRS 12 keeps records of the total number of calls that were made and the selections that were made by the roamer, as shown in step 48. This information is available to the system user as a report. These reports can be obtained either automatically (at a predetermined time each day) or on the demand of the user. Monthly usage statistics reports are also provided. If the number of digits that was received was six, the VRS 12 searches a directory of switch codes. Corresponding to each switch code is a unique audio message which identifies the switch by location and roamer access telephone number and this message is fetched in step 50. The audio message that is associated with the particular roam site is then played to the caller in step 52. The VRS 12 keeps track of the total number of calls as well as the number of calls that are made to roamers at each roam site in step 54.

In a preferred embodiment, the central host computer 14 is a VAX computer sold by Digital Equipment Corporation and is controlled by the following six distinct software modules that control the functions involved in delivering cellular phone services to subscribers.

NCDS_DISPATCH
NCDS_CONTROL
NCDS_RETRY
NCDS_PURGE
NCDS_VALIDATE
NCDS_ALARM

Figure 8:
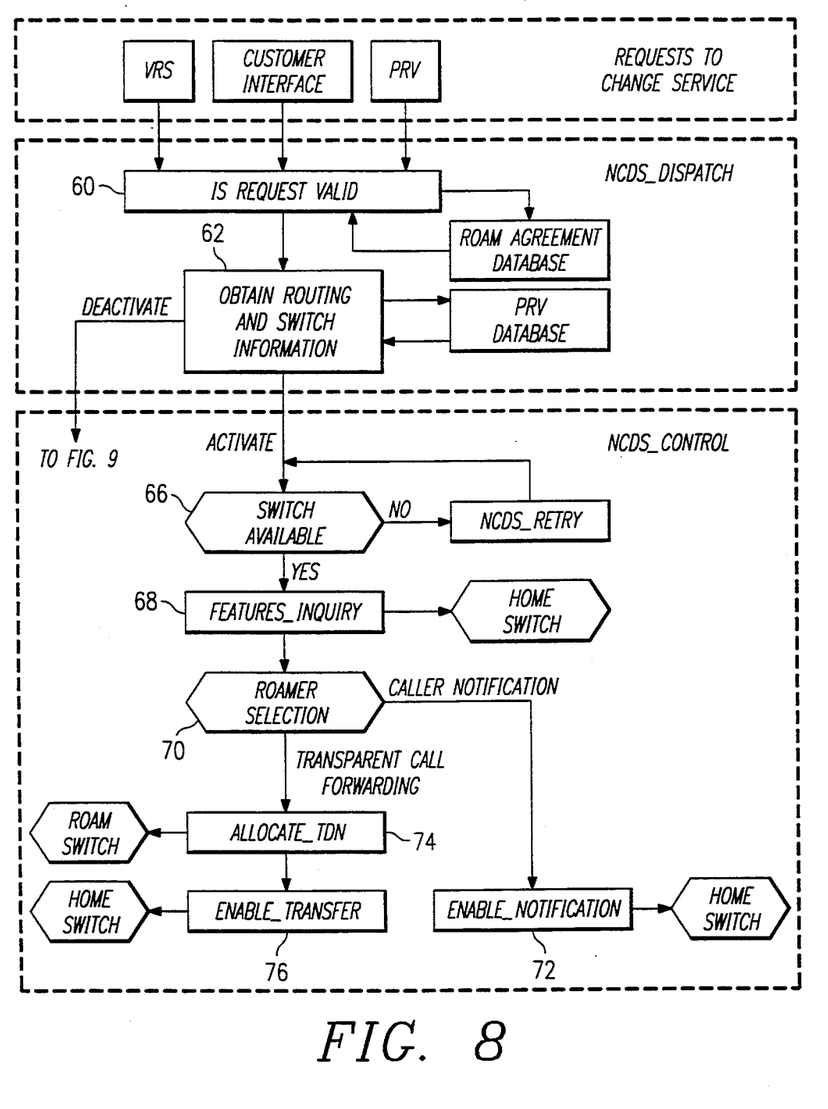
FIG. 8 and 9 are flow charts of the overall control of the cellular telephone system shown in FIG. 1 which allows that system to provide for the dynamic switching of call routing options.

Referring to FIG. 8, the operation of the central host computer 14 as controlled by NCDS will now be described.

The purpose of the NCDS_DISPATCH module is to determine if the subscriber's request is valid, decide how to process the request, and then obtain the information that is needed to process the request. As illustrated in step 60, the central host computer 14 accesses the Roamer Agreement Database to determine if the service that is being requested by the Roamer is consistent with the agreement that exists between the home and roam carriers and the level of service that the roamer has selected. If the request is determined to be a valid request, the central host computer 14 accesses a Positive Roamer Verification (PRV) Database to obtain the routing and switch information as shown in step 62. After this operation has been completed, the central host computer comes under the control of the NCDS_CONTROL module.

NCDS_CONTROL takes the requests that are received by the central host computer 14 and sends out the commands to the switches. Some of the more important commands that are sent out by the central host computer while operating under NCDS_CONTROL are:

FEATURES_INQUIRY
ENABLE_NOTIFICATION
DISABLE_NOTIFICATION
ALLOCATE_TDN
DEALLOCATE_TDN
ENABLE_TRANSFER
DISABLE_TRANSFER
NCDS_RETRY
NCDS_PURGE
NCDS_VALIDATE
NCDS_ALARM

The NCDS_RETRY command is enabled if the command-receiving switch is unable to successfully complete a requested or required option, which would occur, for example, if one of the MTSOs was disabled. As shown in step 66, this process is repeated periodically until it is successful.

In step 68, when a FEATURES_INQUIRY command is issued, the central host computer accesses the home switch and returns the Electronic Serial Number (ESN) of the roamer and a snapshot of the current call forwarding configuration for that subscriber. The ESN is used to verify that the subscriber is valid. The call forwarding configuration is used to determine how to activate the subscriber, and how to restore a subscriber's original settings. The central host computer then determines, in step 70, if the roamer selection was for caller notification service or for transparent call forwarding service. If the selection was for caller notification, the central host computer issues an ENABLE_NOTIFICATION command which accesses the home switch and sets the subscriber's call forwarding features to caller notification as illustrated in step 72.

If the roamer selects call forwarding, the central host computer issues a ALLOCATE_TDN command to obtain a temporary telephone number from the roam switch. As shown in step 74, the Central host computer accesses the "roam" switch and obtains a temporary number for the roamer to use. The central host computer then issues an ENABLE_TRANSFER command to set the subscriber's call forwarding to the temporary telephone number that was previously obtained from the roam switch. As shown in step 76, ENABLE_TRANSFER causes the central host computer to access the "home" switch and change the roamer's call transfer number to the temporary number.

Figure 9:
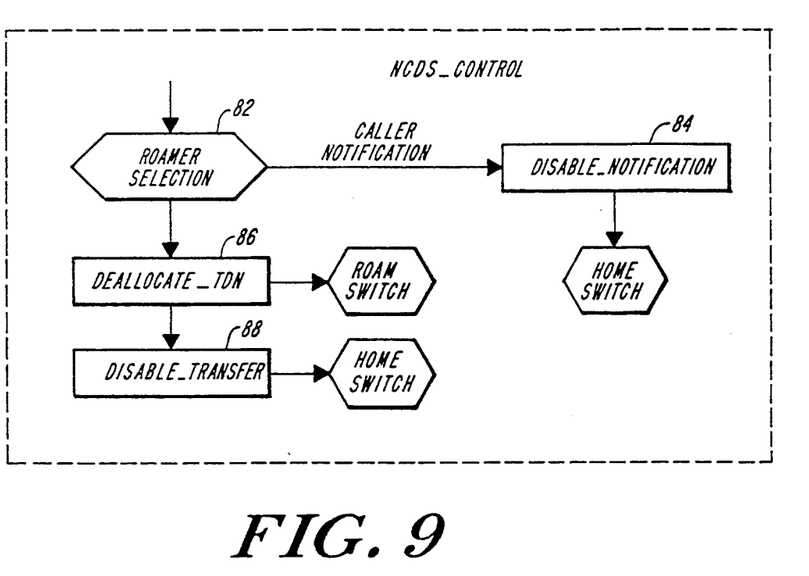

With reference to FIG. 9, the commands issued by the central host computer 14 to deactivate the call handling setup that had been established for a roamer to return the roamer to his original state will now be described. In step 82, the central host computer 14 operating under control of the NCDS_CONTROL module determines if the roamer selection was for caller notification service or for transparent call forwarding service. If the roamer selection was caller notification, the DISABLE_NOTIFICATION command is issued to access the home switch and return the subscriber's call forwarding features to their original settings as shown in step 84. If the roamer selection was transparent call forwarding, the DEALLOCATE_TDN function is utilized in step 86 to return the temporary telephone number to the roam switch when the roamer is through using it. Then in step 88, the DISABLE_TRANSFER function returns the subscriber's call forwarding settings to their original settings.

In order to keep the central host computer records to a manageable level, a NCDS_PURGE function is enabled once each hour to issue a deactivate request for every subscriber that has expired since the last pass. The expiration criteria is that service is deactivated 24 hours after the last call has been made by the roamer in the roam market.

The NCDS_VALIDATE command is issued to periodically revalidate any subscribers that are still active and have not been validated by NCDS in at least 24 hours by sending a FEATURES_INQUIRY command to the home MTSO. If the subscriber is now invalid, a DEACTIVATE request is issued. Finally, as a safety system, the NCDS_ALARM function periodically scans the list of all registered subscribers (regardless of their current call handling activation status) and reports any abnormalities.

Figure 5A:
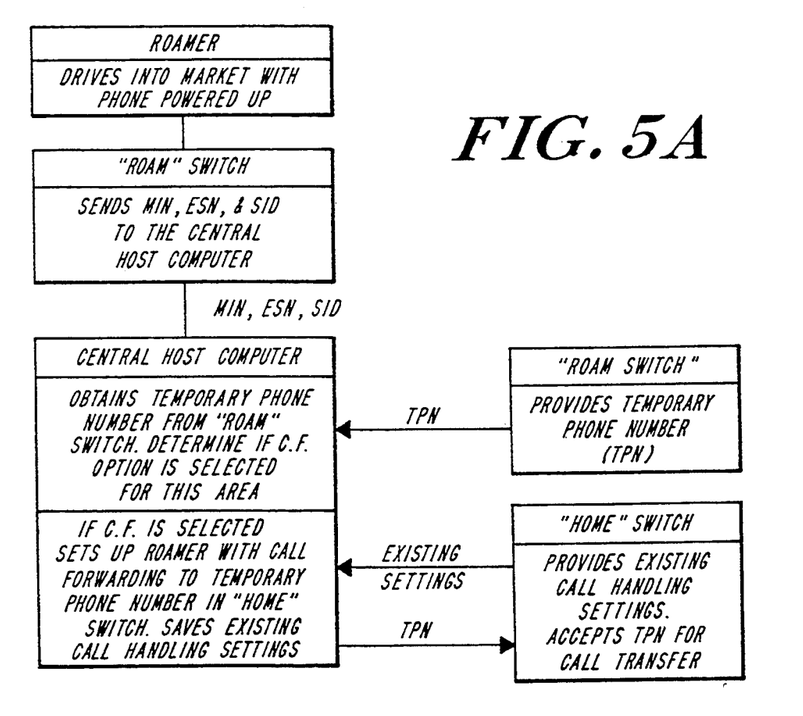
FIG. 5a is a diagram similar to FIG. 5 except that the system uses an autonomous registration system.

In a preferred embodiment shown in FIG. 5a, the system also includes an autonomous registration system which enables an MTSO to detect the presence of a cellular phone in its home service area simply by virtue of the phone being switched on in the geographic area served by the MTSO or by virtue of a phone that it is on as the subscriber moves into the geographic area served by the foreign service area MTSO. In other words, the MTSO is capable of detecting the presence of a cellular phone subscriber in a service area even before the subscriber makes a call. This enables the subscriber to request that a system treat a registration event as an implicit selection of a call handling option. To do this, when a subscriber drives into a new foreign service area with the cellular phone powered-up, the cellular phone automatically detects a change in system ID and sends a registration message to the foreign service area MTSO identifying itself. This feature is built into almost all existing cellular phones. The foreign service area MTSO receives the registration message and notifies a central host computer that a subscriber has been registered. The central host computer checks to see if the caller has indicated that he wanted to activate a certain call handling option when he is in that particular foreign service area, and if that is the case, that service is then activated.

While the foregoing invention has been described with reference to its preferred embodiments, various alterations and modifications will occur to those skilled in the art. All such alterations and modifications are intended to fall within the scope of the appended claims.

What is claimed is:

1. A method for enabling a cellular telephone subscriber to dynamically specify the manner in which calls to the subscriber are to be handled when the subscriber is located in a foreign service area, the method comprising:

detecting the presence of a subscriber in a foreign service area before subscriber makes a call by detecting a change in a MTSO system indentification code;

sending a registration message to at roam site MTSO;

receiving at the roam site MTSO, information indicating which of at least two call handling options is being requested by the subscriber;

validating the subscriber requesting the call handling option;

providing information to a subscriber's home service area MTSO that indicates, based on one of said at least two call handling options, how calls to the subscriber are to be handled while the subscriber is located in the foreign service area; and activating a call handling option for use within a particular foreign service area, if a subscriber had requested activation of said call handling option while in a previous service area.

2. The method for enabling a cellular telephone subscriber to dynamically specify the manner in which the calls to the subscriber are to be handled of claim 1 wherein said keypad is located on the subscriber's handset.

3. The method for enabling a cellular telephone subscriber to dynamically specify the manner in which calls to the subscriber are to be handled of claim 1 wherein one of said call handling option is call forwarding.

4. The method for enabling a cellular telephone subscriber to dynamically specify the manner in which calls to the subscriber are to be handled of claim 1 wherein said step of receiving information indicating the type of call handling option comprises the steps of:

entering a code representing the selected call handling option directly into the cellular telephone;

sending a mobile identification number and said code from a foreign service area switch to a foreign service area voice response system.

5. The method for enabling a cellular telephone subscriber to dynamically specify the manner in which calls to a subscriber are to be handle to claim 1 wherein said step of validating the subscriber comprises the step of sending a mobile identification number, a system identification number of the foreign service area and a code representing the selected call handling option to a central host computer.

6. The method for enabling a cellular telephone subscriber to dynamically specify the manner in which the calls to the subscriber are to be handled to claim 1 further comprising the step of deactivation said requested call handling option by sending a deactivation code to a roam site MTSO or automatically after a preselected number of hours 7. The method for enabling a cellular telephone subscriber to dynamically specify the manner in which the calls to the subscriber are to be handled to claim 1 further comprising the step of activating a preselected one of said at least two call handling options when the subscriber makes a first call in a roam area.

8. The method for enabling a cellular telephone subscriber to dynamically specify the manner in which the calls to the subscriber are to be handled of claim 1 wherein one of said call handling options is caller notification.

9. The method for enabling a cellular telephone subscriber to dynamically specify the manner in which the calls to the subscriber are to be handled of claim 8, wherein if caller notification is selected as a call handling option, providing a roamer port access number to said caller to enable said caller to call said subscriber through a switching means for the foreign service area.

10. The method for enabling a cellular telephone subscriber to dynamically specify the manner in which the calls to the subscriber are to be handled of claim 8 wherein if caller notification is selected as a call handling option, preventing automatic activation of said caller notification option when the subscriber is in a foreign service area.

11. The method for enabling a cellular telephone subscriber to dynamically specify the manner in which the calls to the subscriber are to be handled of claim 1 further comprising the step of:
saving call handling settings that existed prior to the time subscriber specifier a manner in which the subscriber's calls are to be handled in order to enable the subscriber to restore previous call handling settings.

12. The method for enabling a cellular telephone subscriber to dynamically specify the manner in which the calls to the subscriber are to be handle of claim 1 further comprising the step of:
saving call handling settings that existed prior to the time subscriber specified a manner in which the subscriber's calls are to be handled in order to enable the subscriber to restore previous call handling settings.

13. A system for enabling a cellular telephone subscriber to dynamically specify the manner in which calls to the subscriber are to be handled when the subscriber is located in a foreign service area, the system comprising:
means for detecting the presence of a subscriber in a foreign service area before the subscriber makes a call by detecting a change in an MTSO system identification code;
means for receiving one of at least two call handling instructions from a subscriber in a foreign service area for providing from the foreign service area a mobile identification number and a code representing the call handling instructions issued by the subscriber;
a central host processor means for validating the subscriber issuing call handling instructions and for providing information to the subscriber's home service area concerning which of said at least two call handling instructions are to be implemented while the subscriber is located in the foreign service area;
means for sending a registration message to the roam site MTSO; and
means for activating a call handling option for use within a particular foreign service area, if a subscriber had requested activation of said call handling option while in a previous service area.

14. The system for enabling a cellular telephone subscriber to dynamically specify the manner in which the calls to the subscriber are to be handled of claim 13 further comprising means for deactivating said requested call handling option by sending a deactivating code to a roam site MTSO or automatically after a preselected number of hours.

15. The system for enabling a cellular telephone subscriber to dynamically specify the manner in which the calls to the subscriber are to handled of claim 13 further comprising means for activating a preselected one of said at least two call handling options when the subscriber makes a first call in a roam area.

16. The system of claim 13 for enabling a cellular telephone subscriber to dynamically specify the manner in which calls to the subscriber are to be handled when the subscriber is located in a foreign service area, wherein one of said call handling instructions is caller notification.

17. The system for enabling a cellular telephone subscriber to dynamically specify the manner in which calls to the subscriber are to be handled when the subscriber is located in a foreign service area of claim 16, further comprising means for providing a the subscriber is in a foreign service area if caller notification is the call handling instruction issued by said subscriber.

18. The system for enabling a cellular telephone subscriber to dynamically specify the manner in which the calls to the subscriber are to be handled of claim 13 further comprising means for saving call handling settings that existed prior to the time subscriber specified a manner in which the subscriber's calls are to be handled in order to enable the subscriber to restore previous call handling settings 19. A system for enabling a cellular telephone subscriber to dynamically specify the manner in which calls to the subscriber are to be handled when the subscriber is located in a foreign service area, the system comprising:
means for receiving at a roam site MTSO information indicating which of at least two call handling options is being requested by the subscriber;
means for validating the subscriber requesting the call handling option;
means for providing information to a subscriber's home service area MTSO that indicates, based on one of said at least two call handling options, how calls to the subscriber are to be handled while the subscriber is located in the foreign service area; and
means for activating a call handling option for use within a particular foreign service area, if a subscriber had requested activation of said call handling option while in a previous service area.

20. The system of claim 19 for enabling a cellular telephone subscriber to dynamically specify the manner in which calls to the subscriber are to be handled when the subscriber is located in a foreign service area, wherein one of said call handling options is caller notification.

21. The system for enabling a cellular telephone subscriber to dynamically specify the manner in which calls to the subscriber are to be handled when the subscriber is located in a foreign service area of claim 20, further comprising means for providing a roamer port access number to caller who calls the subscriber while the subscriber is in a foreign service area if caller notification is the call handling instruction issued by said subscriber.

22. The system of claim 19 for enabling a cellular telephone subscriber to dynamically specify the manner in which calls to the subscriber are to be handled when the subscriber is located in a foreign service area further comprising means for preventing automatic activation of said caller notification option when the subscriber is in a foreign service area.

23. The system of claim 19 for enabling a cellular telephone subscriber to dynamically specify the manner in which calls to the subscriber are to be handled when the subscriber is located in a foreign service are further comprising means for detecting the presence of a subscriber in a foreign service area before the subscriber makes a call by detecting a change in an MTSO system identification code.

24. The system for enabling a cellular telephone subscriber to dynamically specify the manner in which the calls to the subscriber are to be handled of claim 19 further comprising means for saving call handling settings that existed prior to the time subscriber specified a manner in which the subscriber's calls are to be handled in order to enable the subscriber to restore previous call handling settings.

25. A method for enabling a cellular telephone subscriber to dynamically specify the manner in which calls to the subscriber are to be handled when the subscriber is located in a foreign service area, the method comprising:

sending a registration message to the roam site MTSO;

receiving at a roam site MTSO information indicating which of at least two call handling options is being requested by the subscriber;

validating the subscriber requesting the call handling option;

providing information to a subscriber's home service area MTSO that indicates, based on one of said at least two call handling options, how calls to the subscriber are to be handled while the subscriber is located in the foreign service area; and activating a call handling option for use within a particular foreign service area, if a subscriber had requested activation of said call handling option while in a previous service area.

26. The method for enabling a cellular telephone subscriber to dynamically specify the manner in which calls to the subscriber are to be handled of claim 25 wherein said keypad is located on the subscriber's handset.

27. The method for enabling a cellular telephone subscriber to dynamically specify the manner in which calls to the subscriber are to be handled of claim 25 wherein one of said call handling options is call forwarding.

28. The method for enabling a cellular telephone subscriber to dynamically specify the manner in which calls to the subscriber are to be handled of claim 25 wherein said step of receiving information indicating the type of call handling option comprises the steps of:

entering a code representing the selected call handling option directly into the cellular telephone;

sending a mobile identification number and said code from a foreign service area switch to a foreign service area voice response system.

29. The method for enabling a cellular telephone subscriber to dynamically specify the manner in which calls to a subscriber are to be handled of claim 25 wherein said step of validating the subscriber comprises the step of sending a mobile indentification number, a system indentification number of the foreign service area and a code representing the selected call handling option to a central host computer.

30. The method for enabling a cellular telephone subscriber to dynamically specify the manner in which the calls to the subscriber are to be handled of claim 25 further comprising the step of deactivating said requested call handling option by sending a deactivation code to a roam site MTSO or automatically after a preselected number of hours.

31. The method for enabling a cellular telephone subscriber to a dynamically specify the manner in which the calls to the subscriber are to be handled of claim 25 further comprising the step of activating a preselected one of said at least two call handling options when the subscriber makes a first call in a roam area.

32. The method for enabling a cellular telephone subscriber to dynamically specify the manner in which the calls to the subscriber are to be handled of claim 25 where one of said call handling options is caller notification.

33. The method for enabling a cellular telephone subscriber to dynamically specify the manner in which the calls to the subscriber are to be handled of claim 32 wherein if caller notification is selected as a call handling option, providing a roamer port access number to said caller to enable said caller to call said subscriber through a switching means for the foreign service area.

34. The method for enabling a cellular telephone subscriber to dynamically specify the manner in which the calls to the subscriber are to be handled of claim 32 wherein if caller notification is selected as a call handling option, preventing automatic activation of said caller notification option when the subscriber is in a foreign service area.

* * * * *